United States Patent
Keohane et al.

(10) Patent No.: US 9,372,933 B2
(45) Date of Patent: Jun. 21, 2016

(54) PERSONALIZED QUANTITATIVE MEASURE OF ACCESSIBILITY

(71) Applicant: International Business Machines Corporation, Armonk, NY (US)

(72) Inventors: Susann M. Keohane, Austin, TX (US); Maureen E. Kraft, Hudson, MA (US); Holly L. Nielsen, San Jose, CA (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 14/073,229

(22) Filed: Nov. 6, 2013

(65) Prior Publication Data

US 2015/0127665 A1 May 7, 2015

(51) Int. Cl.
*G06F 17/30* (2006.01)

(52) U.S. Cl.
CPC .................. *G06F 17/30876* (2013.01)

(58) Field of Classification Search
None
See application file for complete search history.

(56) References Cited

U.S. PATENT DOCUMENTS

| | | | |
|---|---|---|---|
| 6,360,235 | B1 | 3/2002 | Tilt et al. |
| 8,090,800 | B2 | 1/2012 | Yee |
| 8,140,444 | B2 | 3/2012 | Bronstad et al. |
| 8,196,104 | B2 | 6/2012 | Cohrs et al. |
| 8,260,903 | B2 | 9/2012 | Ganesh et al. |
| 2008/0133500 | A1 | 6/2008 | Edwards et al. |
| 2008/0155411 | A1 | 6/2008 | Christensen |
| 2012/0254723 | A1 | 10/2012 | Kasa et al. |
| 2012/0290356 | A1 | 11/2012 | Yu |

FOREIGN PATENT DOCUMENTS

WO  WO01/75678 A1  10/2001

OTHER PUBLICATIONS

Hackett, Stephanie and Bambang Parmanto. A Longitudinal Evaluation of Accessibility: Higher Edcuation Web Sites, 2005, Emerald Group Publishing Limited, vol. 15 No. 3, pp. 281-294.*
Bucy, Erik P. and Annie Lang. Formal Features of Cyberspace: Relationships Between Web Page Complexity and Site Traffic, 1999, Journal of the American Society for Information Science, 50(13): 1246-1256.*

(Continued)

*Primary Examiner* — Pierre Vital
*Assistant Examiner* — Alicia Antoine
(74) *Attorney, Agent, or Firm* — Steven R. Tkacs; Stephen J. Walder, Jr.; William J. Stock

(57) ABSTRACT

A mechanism is provided in a data processing system for personalized quantitative measure of accessibility. For a given web site or web application, the mechanism accesses existing crowd sourced user ratings. The mechanism generates a crowd source score for the given web site or web application based on the crowd sourced user ratings. The mechanism generates a compliance score for the given web site or web application based on compliance data published for the given web site or web application. The mechanism obtains a static analysis score for the given web site or web application. The mechanism generates weights for a given user based on user profile information of the given user and applies the weights to the crowd source score, the compliance score, and the static analysis score to form weighted data. The mechanism generates a personalized accessibility score based on the weighted data.

14 Claims, 3 Drawing Sheets

(56) References Cited

OTHER PUBLICATIONS

Parmanto, Bambang and Xiaoming Zeng. Metric for Web Accessibility Evaluation, 2005, Journal of the American Society for Information Science and Technology, 56(13): 1394-1404.*

Echebarria, Markel Vigo. Automatic Assessment of Contextual Web Accessibility from an Evaluation, Measurement and Adaptation Perspective, 2009, Donostia, pp. 3-179.*

Brobst, John L., "United States Federal Health Care Websites: A Multimethod Evaluation of Website Accessibility for Individuals With Disabilities." (2012). Electronic Theses, Treatises and Dissertations. Paper 4737.*

Zeng, Xiaoming et al., "Web Content Accessibility of Consumer Health Information Web Sites for People with Disabilities: A Cross Sectional Evaluation", Journal of Medical Internet Research, v.6, n.2 (2004), 14 pages.

* cited by examiner

PERSONALIZED QUANTITATIVE MEASURE OF ACCESSIBILITY

BACKGROUND

The present application relates generally to an improved data processing apparatus and method and more specifically to mechanisms for a personalized, quantitative measure of accessibility.

Many accessibility compliance standards are available today to provide developers with tools for developing accessible web sites and applications. These standards include W3C Web content Accessibility Guidelines including the Web Accessibility Initiative Accessible Rich Internet Applications (WAI-ARIA), Section 508 of the U.S. Rehabilitation Act and the European Mandate 376. These standards, along with development tools to implement these standards, allow the development of accessible web and software applications that comply to the standards and compliance criteria. Companies, businesses, and enterprises can identify the level of accessibility compliance met through checklist and Voluntary Product Application Templates.

SUMMARY

In one illustrative embodiment, a method, in a data processing system, is provided for personalized quantitative measure of accessibility. The method comprises for a given web site or web application, accessing existing crowd sourced user ratings. The method further comprises generating a crowd source score for the given web site or web application based on the crowd sourced user ratings. The method further comprises generating a compliance score for the given web site or web application based on compliance data published for the given web site or web application. The method further comprises obtaining a static analysis score for the given web site or web application. The method further comprises generating weights for a given user based on user profile information of the given user. The method further comprises applying the weights to the crowd source score, the compliance score, and the static analysis score to form weighted data. The method further comprises generating a personalized accessibility score based on the weighted data.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
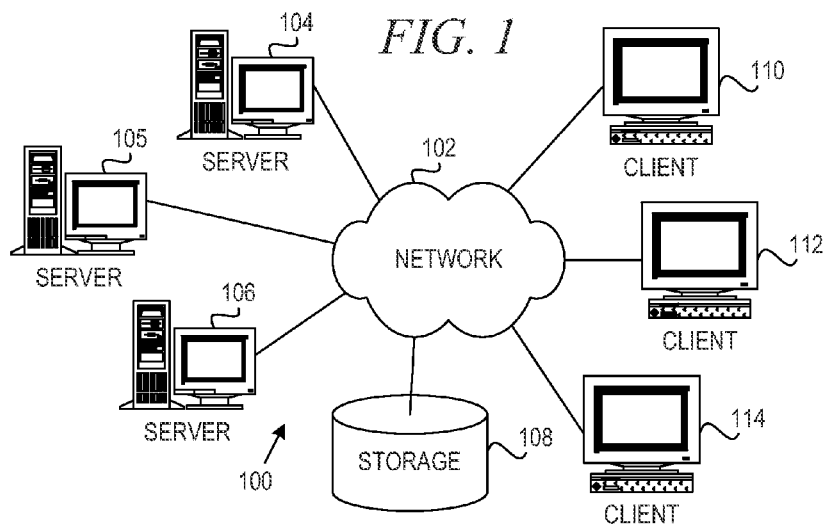
FIG. 1 depicts a pictorial representation of an example distributed data processing system in which aspects of the illustrative embodiments may be implemented.

The illustrative embodiments provide a mechanism for a personalized, quantitative measure of accessibility. The available accessibility compliance standards and means of recording accessibility compliance are helpful in ensuring that development organizations create applications in accordance with current regulations and world-wide standards and help these organizations avoid litigation. However, there is no assurance that the application or web site is ideally usable by every individual or meets all the needs of every individual user. If a user cannot use a web site, then the user may issue a complaint. Such a user may perceive the web site as inaccessible, leaving a corporation, business, government agency, or educational facility at risk of litigation despite the organization's best efforts.

Accessibility compliance is great, because it allows for persons with disabilities (e.g., the elderly, foreign language speakers, or those faced with situational challenges) to access information, facilities, and services that they may not otherwise access due to failing compliance. Many times when a web site or application fails accessibility compliance, the problem is that the user is only receiving a partial solution to meet the user's needs.

As an example, a user may attempt to purchase an item over the Internet. The user may find a retail web site that has been certified to be 100% accessible but may his individual experience to be less than desirable. For instance, a search facility may be confusing resulting in difficulty finding the desired item; there may be a lack of description about the item the user wants to buy; the application may fail to calculate appropriate shipping fees or taxes. Many of these issues can be experienced by everyone but the challenges of these usability issues are heightened for a person with a disability. For instance, there may be an accessible retail web site where a blind user attempts to purchase an item; even though the user is able to navigate the site, the user may have difficulty understanding the item descriptions to confidently make a purchase.

Crowd sourcing applications allow users to provide their own information and ratings for services and facilities, including the accessibility of the business. Typically, crowd sourcing sites discuss accessibility and customer service of businesses, such as restaurants, spas, hotels, etc. that have a physical location rather than reporting on software or web applications. However, some crowd sourcing sites do extend to software and web content. Through modeling and machine learning, these sites apply a score to a web site to indicate how accessible the user feel the site is.

The drawback to crowd sourced information is that it is very subjective and depends on the number of reviewers to give an accurate rating. A user may have a bad experience with customer service and give a business a poor rating even though the business may be fully compliant with accessibility requirements. If this is the only review of the business or web site, then the web site may become stuck at the bottom of search results sorted by accessibility rating. Additional reviews of a business or web site allow for more accurate information; however, this may be a slow process with an initial low accessibility rating.

Alternatively, a crowd sourcing site may provide a banner review web site or application while the application may actually be non-compliant. For example, a web site may have a rating of five out of five while an analysis of the site by an automated test tool may show twenty accessibility compliance violations.

In accordance with the illustrative embodiments, a mechanism is provided for generating a numerical value for accessible usability evaluation of a web site or web application. The mechanism takes inputs from a system that aggregates social crowd-sourced experimental data with accessibility compliance data, statistical analysis data, and data analysis of a web application or web site. The mechanism applies weights from user preferences or operating system or device configuration and calculates a numerical value that represents accessible usability percentage.

The mechanism takes into account compliance information, automated analysis of data, and structure of a web site or web application, and data analysis of web application or web site content. The mechanism then combines this input according to the user preference input, which may include user's disability type, color and contrast preferences, etc. For instance, users with a different color and contrast preferences may rate the accessibility of the same web page differently, depending on the contrast and color schema of the page. The mechanism then generates a numerical value that assesses the overall accessibility compliance and accessible usability of a web site or web application.

The prior art either provides an analysis of a web application's accessibility compliance based on standards and government requirements or provides user experiential data and a view of how accessible a user feels a web site or application is based on actual interactions. On the other hand, the mechanism of the illustrative embodiments generates a personalized accessibility score that takes into account the user's disability and particular preferences. The mechanism illustrative embodiments also identifies potential risk of litigation in addition to providing an accurate, quantitative score or rating to the user.

Figure 2:
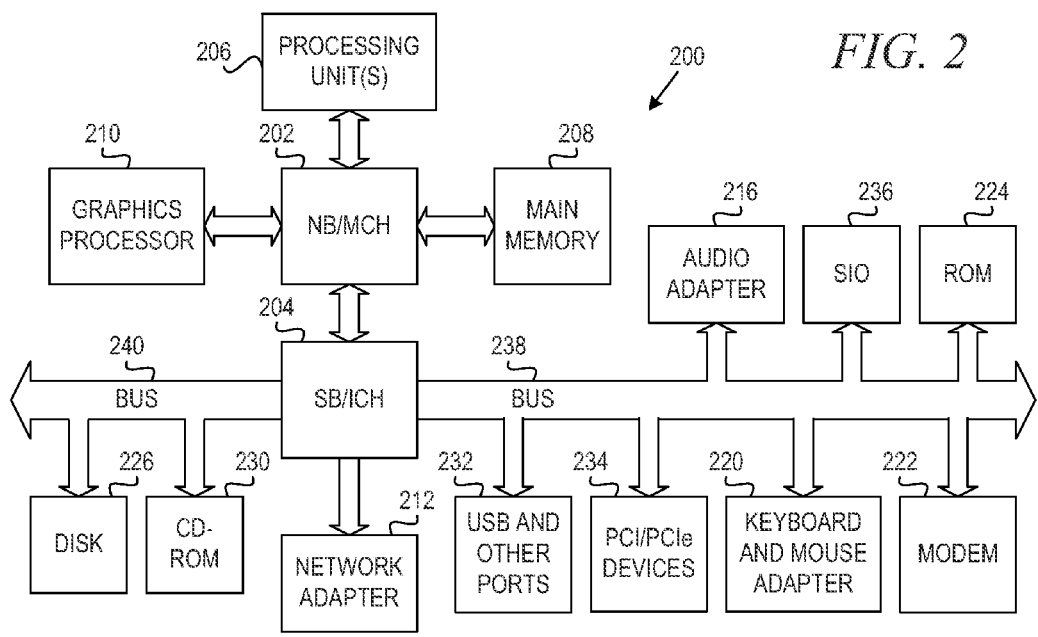
FIG. 2 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, servers 104, 105, 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In accordance with an illustrative embodiment, server 104 may provide web content, such as a web site or application, to users at clients 110, 112, 114. Server 106 may provide a crowd sourcing site that allows users to rate their experiences based on accessibility. The illustrative embodiment provides a mechanism for a personalized, quantitative measure of accessibility. The mechanism may exist as software executing on clients 110, 112, 114 or alternatively may exist as a web application executing on a server, such as server 105, which is accessible by end users at clients 110, 112, 114.

The mechanism access existing crowd sourced data and compliance data published about an existing web site or application. The mechanism then performs a static analysis of the web page using automated accessibility analysis tools to produce a set of accessibility violations based upon worldwide or government standards. The mechanism then performs an analysis using data analytics to determine whether sufficient descriptions and labeling of the existing elements on the page have been provided. The mechanism accesses user entered preferences or operating system preferences to apply weights to the different crowd sourced ratings, compliance data, and analysis data. The mechanism then generates a numerical value measuring the usable accessibility of the web site or application based on the compliance data, static analysis, data analysis, user rating, and user preferences.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
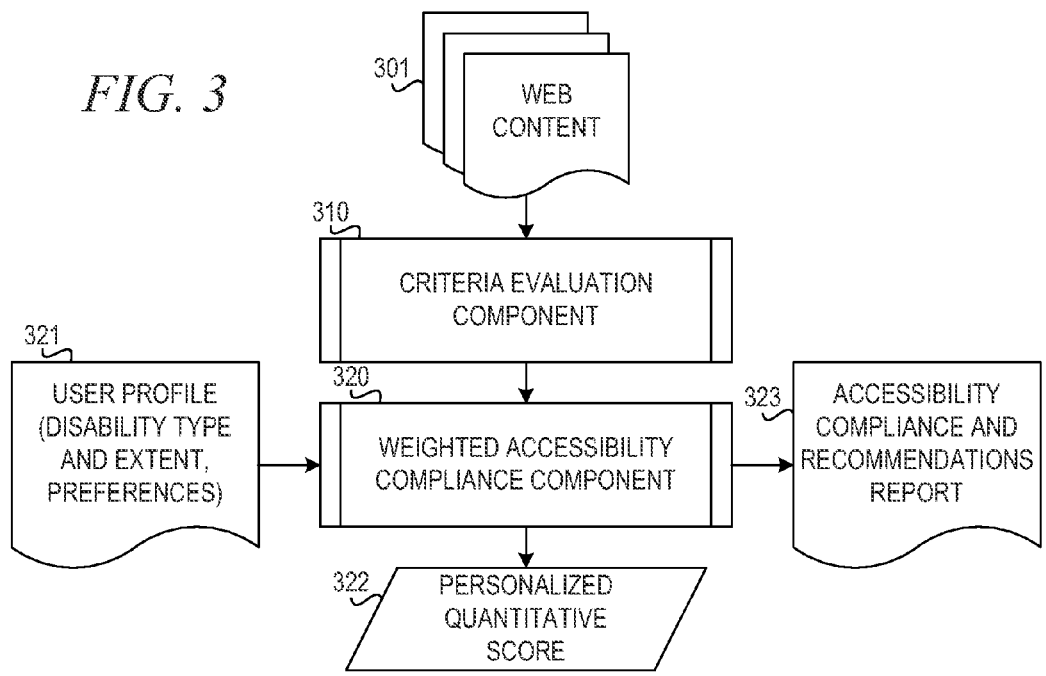
FIG. 3 is a block diagram illustrating a mechanism for generating a personalized quantitative measure of accessibility in accordance with an illustrative embodiment.

FIG. 3 is a block diagram illustrating a mechanism for generating a personalized quantitative measure of accessibility in accordance with an illustrative embodiment. Criteria evaluation component 310 accesses existing crowd sourced accessibility information for web content 301. The crowd sourced accessibility information may be a consolidated accessibility score based on user ratings. Alternatively, the crowd sourced accessibility information may comprise all or a subset of the individual user ratings to generate a custom crowd sourced accessibility score.

Criteria evaluation component 310 also accesses compliance data published about web content 301. The published compliance data may comprise checklists or Voluntary Product Accessibility Template® (VPAT) information. Criteria evaluation component 310 performs static analysis of the web page using automated accessibility analysis tools to produce a set of accessibility violations based on world-wide or government standards, and this can further be used to generate a static analysis score. Alternatively, criteria evaluation component 310 may access a report of previously performed static analysis. Criteria, component 310 then performs analysis using data analytics to determine whether sufficient descriptions and labeling of the existing elements on the page have been used. The operation of criteria evaluation component 310 is described in further detail below with reference to FIG. 4.

Weighted accessibility compliance component 320 accesses user profile 321, which may include user entered preferences, device configuration, operating system settings, disability type, and the like. For example, a device configuration may inform weighted accessibility compliance component 320 that the user has particular devices such as a refreshable braille display, for example. Operating system settings, such as keyboard settings or screen reader usage, may also inform weighted accessibility compliance component 320 about the user's disability and perhaps even extent. The user may enter a disability type and extent into user profile 321, for instance, blind, color blind or low vision. Weighted accessibility compliance component 320 determines and applies weights to the different compliance and analysis data to form a comprehensive, quantitative result based on the user profile or disability type 322, which is calculated based on the compliance data, static analysis, data analysis, user ratings, and/or user preferences. This numerical value may be expressed as a percentage, for example, measuring the usable accessibility of web content 301. Operation of weighted accessibility compliance component 320 is described in further detail below with reference to FIG. 5.

A user may access result 322 through a browser search where the search engine ranks search results based at least in part on the usable accessibility score. The developer may also advertise web content 301 with an accessibility score customized for the user as part of the description.

Weighted accessibility compliance component 320 may also provide a risk assessment with recommendations for the content author or user 323. A corporation or web site owner may access the recommendations or risk assessment 323, thus assisting parties to avoid potential litigation or grievance.

Figure 4:
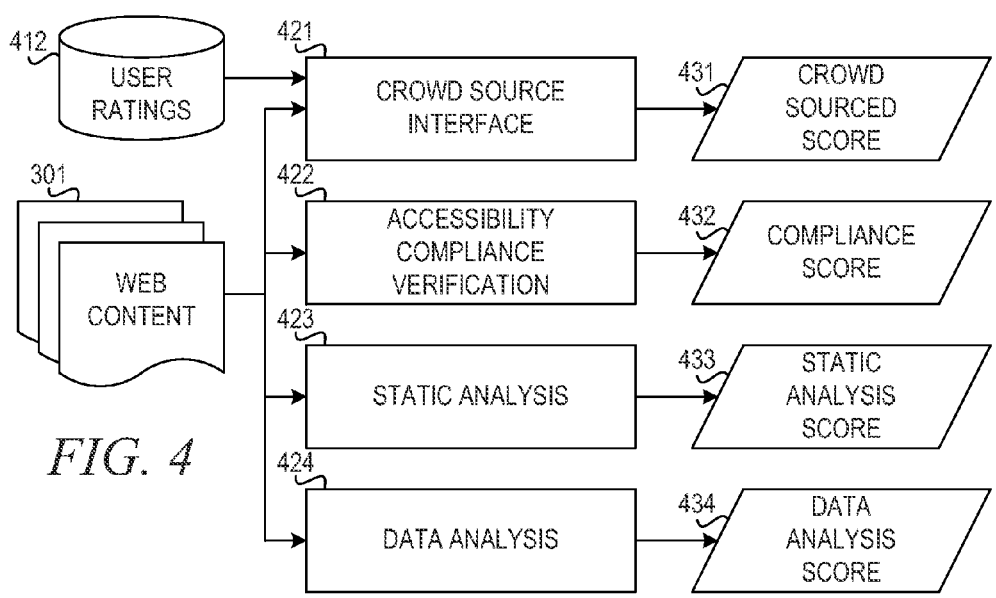
FIG. 4 is a block diagram illustrating operation of criteria evaluation in accordance with an illustrative embodiment.

FIG. 4 is a block diagram illustrating operation of criteria evaluation in accordance with an illustrative embodiment. Crowd source interface 421 receives user ratings 412 from one or more crowd sourcing web sites. User ratings 412 may comprise a single composite rating from a crowd sourcing web site. For example, in common crowd sourcing mechanisms, such as product reviews and the like, a user can read all or a subset of the individual reviews, consider the overall review derived from a composite of the individual reviews, or leave a review. Alternatively, user ratings 412 may comprise a subset of ratings that are relevant to the user. For example, if the user has a particular disability, user ratings 412 may comprise only those ratings by users with the same disability. In yet another example embodiment, user ratings 412 may comprise a combination of user ratings from various crowd sourcing sites.

Crowd source interface 421 then generates crowd sourced score 431. Crowd source interface 421 may simply pass a single composite score from user ratings 412. Alternatively, crowd source interface 421 may calculate crowd sourced score 431 based on a plurality of user ratings obtained from one or more crowd sourcing sites.

Accessibility compliance verification component 422 determines compliance score 432. Accessibility compliance verification component 422 may access compliance data published about the existing web content 301, which may comprise checklists or Voluntary Product Accessibility Template® (VPAT) information. Accessibility compliance verification component 422 then generates compliance score 432 based on the compliance data.

Static analysis component 423 performs static analysis of web content 301 using automated accessibility tools to produce a set of accessibility violations based on world-wide or government standards. In an alternative embodiment, static analysis component 423 accesses a report of previously performed static analysis. Static analysis component 423 then generates static analysis score 433 based on the results of the static analysis.

Data analysis component 424 performs analysis of web content 301 using data analytics to determine if sufficient descriptions and labeling of the existing elements within web content 301 have been used. The data analytics may include semantic analysis of the description or label, or analysis of a product picture to reveal the information about the product, etc. Data analysis component 424 generates data analysis score 434 based on results of the data analysis.

Figure 5:
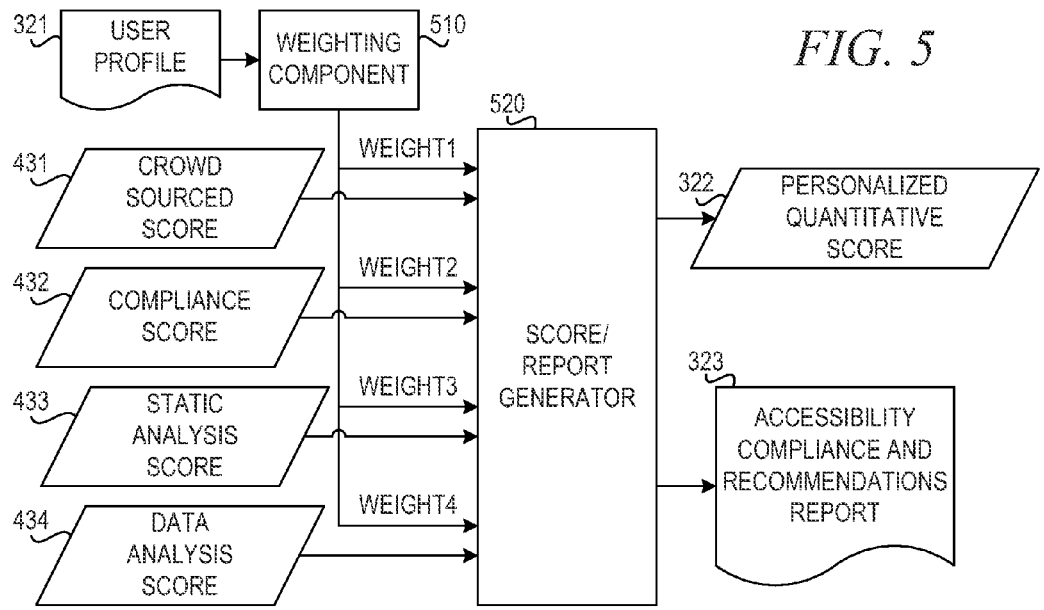
FIG. 5 is a block diagram illustrating operation of a weighted accessibility compliance component in accordance with an illustrative embodiment.

FIG. 5 is a block diagram illustrating operation of a weighted accessibility compliance component in accordance with an illustrative embodiment. Weighting component 510 receives user profile 321, which may include user-defined weights. In one example embodiment, weighting component 510 provides these user defined weights to score/report generator 520.

In an alternative embodiment, user profile 321 may comprise user preferences other than explicitly defined weights. For instance, user profile 301 may define the user's disability type and extent. In another example, user profile 301 may comprise operating system settings, device configuration information, or other user preferences. Weighting component 510 may determine the user's disability type and extent based on the user preferences, operating system settings, or device configuration information. Weighting component 510 may then determine weights and provide the weights to score/report generator 520.

In the illustrative embodiment, weighting component 510 provides a weight for each score to be considered by score/report generator 520. For instance, weight1 corresponds to crowd sourced score 431, weight2 corresponds to compliance score 432, weight3 corresponds to static analysis score 433, and weight4 corresponds to data analysis score 434.

It should be noted that the illustrative embodiments are not limited to only crowd sourced score 431, compliance score 432, static analysis score 433, and data analysis score 434. The illustrative embodiments may apply to more or fewer contributing scores, including accessibility compliance measures not mentioned herein.

Score/report generator 520 receives crowd sourced score 431 with weight1, compliance score 432 with weight2, static analysis score 433 with weight3, and data analysis score 434 with weight4. Score/report generator 520 then determines personalized quantitative score 322 based on the weighted scores. In one example embodiment, personalized quantitative score 322 may be a percentage measuring the usable accessibility of the web site or application for a particular user given that user's preferences, disability, and the extent of disability.

In one example embodiment, score/report generator 520 calculates personalized quantitative score 322 as follows:

Score=((weight1)(crowd_sourced_score)+(weight2)(compliance_score)+(weight3)(static_analysis_score)+(weight4)(data_analysis_score))/SUM(weight1, weight2, weight3, weight4)

Score/100 represents a percentage expression of the personalized quantitative score 322.

Weight1 takes into account the user preferences that indicate the strength of the crowd sourced input (not at all=0, average=1, high=2, strong=3). Weight2 takes into account end user preferences for parties where the compliance score is of most importance (not at all=0, average=1, high=2, strong=3). Weight2 may also be influenced by the type of disability for which the end user or application owner is focused. Weight3 represents a weight applied to the score of the static analysis run against the web site or application (not at all=0, average=1, high=2, strong=3). Weight4 takes into account end user preferences for parties where data analysis is of most importance (not at all=0, average=1, high=2, strong=3). Weight4 may also be influenced by the type of disability of the end user discovered by operating system settings or device configuration information (e.g., presence of screen reader, low vision settings, etc.).

Score/report generator 520 may also generate accessibility compliance and recommendations report 323. Thus, score/report generator 520 may provide a risk assessment to the web site or application owner, web site or application author, an employer, or an organization in which the web site or application is being deployed. Report 323 assists such parties in avoiding potential litigation or compliant regarding real or perceived accessibility compliance failures.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art. In view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium is a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium is any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 6:
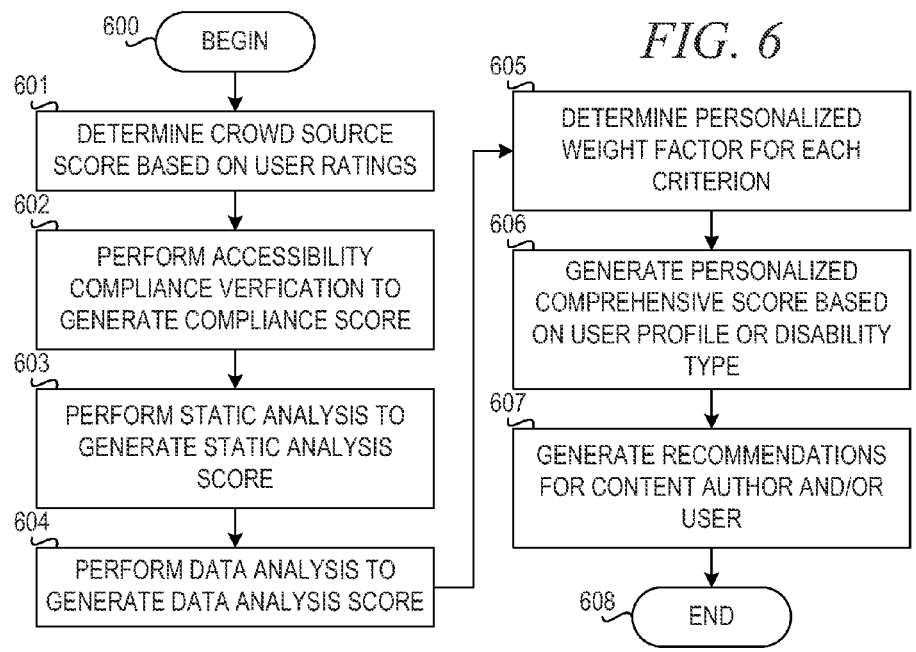
FIG. 6 is a flowchart illustrating operation of a mechanism for personalized quantitative measure of accessibility in accordance with an illustrative embodiment

FIG. 6 is a flowchart illustrating operation of a mechanism for personalized quantitative measure of accessibility in accordance with an illustrative embodiment. Operation begins (block 600), and the mechanism determines a crowd source score based on one or more user ratings (block 601). The mechanism then performs accessibility compliance verification to generate a compliance score (block 602). The mechanism performs static analysis to generate a static analysis score (block 603). Then, the mechanism performs data analysis to generate a data analysis score (block 604).

The mechanism determines a personalized weight factor for each criterion (block 605). The mechanism then generates a personalized comprehensive score based on user profile or disability type (block 606). The mechanism generates the personalized score applying the weights from block 605 to the scores generated in blocks 601-604. Thereafter, the mechanism generates recommendations for the content author or other parties (block 607), and operation ends (block 608).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As noted above, it should be appreciated that the illustrative embodiments may take the form of an entirety hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, hulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for personalized quantitative measure of accessibility, the method comprising:

for a given web site or web application, accessing, by a crowd source interface executing on at least one processor of the data processing system, existing crowd sourced user ratings;

generating, by the crowd source interface, a crowd source score for the given web site or web application based on the crowd sourced user ratings;

generating, by an accessibility compliance verification component executing on the at least one processor of the data processing system, a compliance score for the given web site or web application based on compliance data published for the given web site or web application;

obtaining, by a static analysis component executing on the at least one processor of the data processing system, a static analysis score for the given web site or web application;

performing, by a data analysis component executing on the at least one processor of the data processing system, data analysis using data analytics to determine whether sufficient descriptions and labeling of existing elements on the given web site or web application have been used;

generating, by the data analysis component, a data analysis score based on results of the data analysis;

generating, by a score generator executing on the at least one processor of the data processing system, weights for a given user based on user profile information of the given user;

applying, by the score generator, the weights to the crowd source score, the compliance score, the static analysis score, and the data analysis score to form weighted data;

generating, by the score generator, a personalized accessibility score based on the weighted data, wherein generating the personalized accessibility score comprises entering the weights into an algorithm that performs a calculation to generate a numerical data value, wherein the numerical data value is a percentage measuring the usable accessibility of the given web site or web application based on the crowd source score, compliance score, static analysis score, and data analysis score; and outputting, by the score generator, the personalized accessibility score.

2. The method of claim 1, wherein obtaining a static analysis score comprises performing static analysis of the given web site or web application using automated accessibility analysis tools to identify a set of accessibility violations; and generating the static analysis score based on the set of accessibility violations.

3. The method of claim 1, wherein applying the weights comprises accessing user-defined weights obtained from the user profile information.

4. The method of claim 1, further comprising:

providing the accessibility score to a user, a browser search, a retail application, or a corporation or web site owner.

5. The method of claim 1, wherein generating the accessibility score comprises generating the accessibility score based on a type of disability of an end user or a type of disability on which an owner of the given web site or web application is focused.

6. The method of claim 5, further comprising:

determining the type of disability based on operating system settings or device configuration information in the user profile information.

7. The method of claim 1, further comprising:
generating an accessibility compliance report comprising recommendations for making the web site or web application more compliant.

8. A computer program product comprising a non-transitory computer readable storage medium having a computer readable program stored therein, wherein the computer readable program, when executed on a computing device, causes the computing device to:
for a given web site or web application, access existing crowd sourced user ratings;
generate a crowd source score for the given web site or web application based on the crowd sourced user ratings;
generate a compliance score for the given web site or web application based on compliance data published for the given web site or web application;
obtain a static analysis score for the given web site or web application;
perform data analysis using data analytics to determine whether sufficient descriptions and labeling of existing elements on the given web site or web application have been used;
generate a data analysis score based on results of the data analysis;
generate weights for a given user based on user profile information of the given user;
apply the weights to the crowd source score, the compliance score, the static analysis score, and the data analysis score to form weighted data;
generate a personalized accessibility score based on the weighted data, wherein generating the personalized accessibility score comprises entering the weights into an algorithm that performs a calculation to generate a numerical data value, wherein the numerical data value is a percentage measuring the usable accessibility of the given web site or web application based on the crowd source score, compliance score, static analysis score, and data analysis score; and
output the personalized accessibility score.

9. The computer program product of claim 8, wherein obtaining a static analysis score comprises
performing static analysis of the given web site or web application using automated accessibility analysis tools to identify a set of accessibility violations; and
generating the static analysis score based on the set of accessibility violations.

10. The computer program product of claim 8, wherein the computer readable program further causes the computing device to:
provide the accessibility score to a user, a browser search, a retail application, or a corporation or web site owner.

11. The computer program product of claim 8, wherein generating the accessibility score comprises generating the accessibility score based on a type of disability of an end user or a type of disability on which an owner of the given web site or web application is focused.

12. An apparatus comprising:
a processor; and
a memory coupled to the processor, wherein the memory comprises instructions which, when executed by the processor, cause the processor to:
for a given web site or web application, access existing crowd sourced user ratings;
generate a crowd source score for the given web site or web application based on the crowd sourced user ratings;
generate a compliance score for the given web site or web application based on compliance data published for the given web site or web application;
obtain a static analysis score for the given web site or web application;
perform data analysis using data analytics to determine whether sufficient descriptions and labeling of existing elements on the given web site or web application have been used;
generate a data analysis score based on results of the data analysis;
generate weights for a given user based on user profile information of the given user;
apply the weights to the crowd source score, the compliance score, the static analysis score, and the data analysis score to form weighted data;
generate a personalized accessibility score based on the weighted data, wherein generating the personalized accessibility score comprises entering the weights into an algorithm that performs a calculation to generate a numerical data value, wherein the numerical data value is a percentage measuring the usable accessibility of the given web site or web application based on the crowd source score, compliance score, static analysis score, and data analysis score; and
output the personalized accessibility score.

13. The apparatus of claim 12, wherein obtaining a static analysis score comprises
performing static analysis of the given web site or web application using automated accessibility analysis tools to identify a set of accessibility violations; and
generating the static analysis score based on the set of accessibility violations.

14. The apparatus of claim 12, wherein generating the accessibility score comprises generating the accessibility score based on a type of disability of an end user or a type of disability on which an owner of the given web site or web application is focused.

* * * * *